(12) United States Patent
Cociglio

(10) Patent No.: US 12,494,988 B2
(45) Date of Patent: Dec. 9, 2025

(54) ROUND-TRIP TIME MEASUREMENT IN A PACKET-SWITCHED COMMUNICATION NETWORK

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 14 days.

(21) Appl. No.: 18/259,341

(22) PCT Filed: Dec. 28, 2021

(86) PCT No.: PCT/EP2021/087711
§ 371 (c)(1),
(2) Date: Jun. 26, 2023

(87) PCT Pub. No.: WO2022/144348
PCT Pub. Date: Jul. 7, 2022

(65) Prior Publication Data
US 2024/0064090 A1    Feb. 22, 2024

(30) Foreign Application Priority Data

Dec. 30, 2020  (IT) .................. 102020000032855

(51) Int. Cl.
*H04L 45/121*  (2022.01)
*H04L 43/0864* (2022.01)
(Continued)

(52) U.S. Cl.
CPC ........ *H04L 45/121* (2013.01); *H04L 43/0864* (2013.01); *H04L 43/16* (2013.01); *H04L 45/123* (2013.01)

(58) Field of Classification Search
None
See application file for complete search history.

(56) References Cited

U.S. PATENT DOCUMENTS

| 6,813,244 B1 * | 11/2004 | He ................. H04L 43/0882 370/252 |
| 2012/0275333 A1 | 11/2012 | Cociglio |
| 2016/0105353 A1 * | 4/2016 | Cociglio ............. H04L 43/50 370/252 |

FOREIGN PATENT DOCUMENTS

| EP | 2 636 185 A1 | 9/2013 | |
| WO | WO-2019206862 A1 * | 10/2019 | ........... H04L 43/022 |

OTHER PUBLICATIONS

International Search Report mailed on Mar. 25, 2022 in PCT/EP2021/087711 filed on Dec. 28, 2021 (4 pages).
(Continued)

*Primary Examiner* — Fadi Haj Said
(74) *Attorney, Agent, or Firm* — Oblon, McClelland, Maier & Neustadt, L.L.P.

(57) ABSTRACT

It is disclosed a method for performing a RTT measurement on a bidirectional packet flow transmitted between two nodes of a packet-switched communication network. Each node applies a respective marking value to its outgoing packets, and switches outgoing packet does not exceed a predefined time threshold. An intermediate measurement point may provide an RTT measurement as a time lapsing between two consecutive switching of the marking value in the packets transmitted in a certain direction.

17 Claims, 6 Drawing Sheets

(51) Int. Cl.
 *H04L 43/16* (2022.01)
 *H04L 45/12* (2022.01)

(56) References Cited

OTHER PUBLICATIONS

Cociglio, et al. "Client-Server Explicit Performance Measurements; draft-cfb-ippm-spinbit-measurements-02", Internet—Draft: IPPM, Internet Engineering Task Force, IETF; Standardworkingdraft, Internet Society (ISOC), No. 2, Jul. 3, 2020, pp. 1-26, XP015140360.
Trammell, et al. "The Addition of a Spin Bit to the QUIC Transport Protocol; draft-trammell-quic-spin-01", Internet-Draft: QUIC, Internet Engineering Task Force, IETF; Standardworkingdraft, Internet Society (ISOC), No. 1, Dec. 13, 2017, pp. 1-22, XP015124750.

* cited by examiner

ROUND-TRIP TIME MEASUREMENT IN A PACKET-SWITCHED COMMUNICATION NETWORK

TECHNICAL FIELD

The present invention relates to the field of communication networks. In particular, the present invention relates to a round-trip time (RTT) measurement on a bidirectional packet flow carrying live traffic through a packet-switched communication network.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Each packet is transmitted at a transmission time by the source node and is received at a reception time by the destination node. The time lapsing between transmission time and reception time is typically called "one-way delay". The one-way delay of a packet mainly depends on the number of possible intermediate nodes crossed by the packet from source to destination, the processing time of the packet by each node and the propagation time along the links.

Techniques are known which provide RTT (round-trip time) measurements, instead of one-way delay measurements. The RTT is the time lapsing between transmission time of a packet and reception time of an acknowledge packet transmitted in the opposite direction. RTT measurements are helpful especially because they do not require mutual synchronization of the local clocks at the various network nodes.

While some RTT measurement techniques (e.g. Ping) make use of artificial packets expressly generated for measurement purpose, some other RTT measurement techniques are performed on live traffic, namely on packets not generated for the purpose of performing the measurement.

As known, QUIC (Quick UDP Internet Connections) is a transport layer (layer 4) network protocol designed to support multiplexed connections between two endpoints over User Datagram Protocol (UDP).

B. Trammel et al.: Internet draft "The addition of a Spin Bit to the QUIC Transport Protocol draft-trammel-quic-spin-01", Dec. 13, 2017 describes the addition of a so-called "latency spin bit" (or, briefly, "spin bit") in the QUIC header, which allows RTT measurements on two counter-propagating packet flows exchanged between two endpoints of a QUIC connection. According to the Internet draft, both the endpoints (also termed "client" and "server") initially transmit the respective packets with the value of their spin bits set to 0. The client starts an RTT measurement by setting the value of its spin bit to 1. This change of spin bit value may be seen as an edge in the spin bit signal transmitted from client to server. As the server receives such edge, it changes the value of its own spin bit from 0 to 1. This way, the server substantially reflects the edge of the spin bit signal back to the client. As the client receives the reflected edge of the spin bit signal from the server, it switches the value of its spin bit back to 0. This may be seen as another edge in the spin bit signal transmitted from client to server, which is received at the server and reflected back to the client as described above. A rough RTT may then be measured at any intermediate measurement point placed between client and server, as the duration of a spin bit period, namely of the time lapsing between passage in a same direction (e.g. from client to server) of two consecutive edges of the spin bit signal.

SUMMARY OF THE INVENTION

The Applicant has noticed that the RTT measurement disclosed by the above Internet draft by B. Trammel et al. disadvantageously exhibits some drawbacks.

In particular, since the measurement is carried out on live traffic, the packet rate in both directions typically fluctuates in an unpredictable way and may temporarily become very low or even zero. This introduces an unpredictable delay in the spin bit reflection mechanism carried out by each one of the endpoints. As an endpoint receives a packet with a certain spin bit value, it shall indeed wait the next packet to be transmitted in the opposite direction, in order to reflect the received spin bit value. If this packet carries an edge of the spin bit signal (namely, its spin bit value is different from the spin bit values of the preceding packets), this results in an unpredictable delay of the reflection of the edge of the spin bit signal. This unpredictable delay ultimately results in an unpredictable error on the RTT measurement carried out by the intermediate measurement point which, as discussed above, is based on the detection times of two consecutive edges of the spin bit signal.

In view of the above, the Applicant has tackled the problem of providing a method for transmitting a bidirectional packet flow carrying live traffic exchanged between two nodes of a packet-switched communication network, which enables more reliable RTT measurements on the packet flow, even when its packet rate fluctuates in an unpredictable way and temporarily become very low or even zero.

In the following description and in the claims, the expression "enabling an RTT measurement" will designate an operation of marking and/or conditioning the packets of the bidirectional packet flow to be measured in such a way that an RTT measurement can be made by a measurement point placed on the path of the packet flow, either at an intermediate position of the path or at an endpoint of the path.

According to embodiments of the present invention, the above problem is solved by a method wherein each node applies a respective marking value (by way of non limiting example, the spin bit value) to the packets to be transmitted to the other node. Each node switches its applicable marking value when it detects that the marking value applied to the packets which are being received from the other node has been switched, only if it determines that the time lapsing between detection of the switching of the marking value applied to the packets which are being received from the other node and transmission of the next packet to the other node does not exceed a predefined time threshold.

This operation of the nodes advantageously enables reliable RTT measurements.

Assuming that, before the measurement session, both the nodes are configured with an applicable marking value equal to e.g. 0, a first node (for example the node acting as client of a QUIC connection) starts a measurement session by switching its applicable marking value from 0 to 1. As the second node (for example the node acting as server of a QUIC connection) detects such switching in the packets which are being received from the first node, if the time lapsing between such detection and transmission of the next packet to the first node does not exceed a time threshold E2, it also switches its applicable marking value from 0 to 1. As the first node detects such switching in the packets which are being received from the second node, if the time lapsing between such detection and transmission of the next packet to the second node does not exceed a time threshold E1, it switches its applicable marking value back from 1 to 0.

A measurement point placed on the path of the bidirectional packet flow (namely, at an intermediate position or at any of the two nodes) may then perform an RTT measurement by detecting, in the packets transmitted from the first node to the second node, the first switching from 0 to 1 and the second switching from 1 to 0 of the marking value applied by the first node. The measured RTT basically is the time lapsing between the detection times of these two consecutive switching of the marking value applied by the first node, short of a maximum error which is substantially equal to E1+E2.

Hence, advantageously, the method according to embodiments of the present invention provides more reliable results of the RTT measurement. In particular, an RTT measurement is provided which is affected by a predictable, maximum error of E1+E2, irrespective of the unpredictable fluctuations of the packet rates in the two opposite directions.

According to a first aspect, the present invention provides a method for transmitting a bidirectional packet flow between two nodes of a packet-switched communication network, each one applying a respective marking value to packets of the bidirectional packet flow to be transmitted to the other node, the method comprising:
  a) by each one of the two nodes, switching the respective marking value applicable to packets of the bidirectional packet flow to be transmitted to the other node upon detection of a switching of the marking value applied to packets of the bidirectional packet which are being received from the other node,
  wherein each one of the two nodes performs the switching of the respective marking value applicable to the packets of the bidirectional packet flow to be transmitted to the other node only if a time lapsing between such detection and subsequent transmission of a packet to the other node does not exceed a respective predefined threshold.

According to an advantageous embodiment, one of the two nodes forces a switching of the respective marking value applicable to packets of the bidirectional packet flow to be transmitted to the other node when a maximum time Tmax has lapsed since last switching of the respective marking value applicable to packets of the bidirectional packet flow to be transmitted to the other node.

Preferably, at each one of the nodes the respective predefined threshold is counted by a local timer which the each one of the nodes starts upon detection of a switching of the marking value applied to packets of the bidirectional packet which are being received from the other node.

According to an embodiment, at least one of the two nodes dynamically varies the respective predefined threshold.

Preferably, at least one of the two nodes sets, when a measurement session is started, the respective predefined threshold to a maximum value Emax and decrease the respective predefined threshold when the time lapsing between detection and subsequent transmission of a packet to the other one of the two nodes does not exceed the respective predefined threshold.

According to a variant, the respective predefined threshold is decreased step-by-step.

Preferably, the respective predefined threshold is decreased until a minimum value Emin.

Preferably, the maximum time Tmax is counted by a further local timer which the node starts when it switches the respective marking value applicable to packets of the bidirectional packet flow to be transmitted to the other node, the node forcing a switching of the respective marking value applicable to packets of the bidirectional packet flow to be transmitted to the other node upon expiry of the further local timer.

According to some embodiments, the maximum time Tmax is higher than a maximum round-trip time between the two nodes.

Alternatively, the maximum time Tmax is calculated as a function of a previously measured round-trip time between the two nodes.

According to a variant, the maximum time Tmax is calculated as Tmax=k×RTT*+Q, where RTT* is the previously measured round-trip time between the two nodes and k and Q are empirical variables.

According to a second aspect, the present invention provides a method for performing a round-trip time measurement on a bidirectional packet flow transmitted between two nodes of a packet-switched communication network, each one of the two nodes applying a respective marking value to packets of the bidirectional packet flow to be transmitted to the other node, the method comprising the steps of the method as set forth above and:
  b) by a measurement point placed on a path of the bidirectional packet flow, detecting a first switching and a second switching of the marking value applied to packets of the bidirectional packet flow transmitted from one node and to the node and providing a round-trip time measurement between the two nodes as a time lapsing between the first switching and the second switching.

Preferably, step b) comprises discarding the round-trip time measurement if it is determined that the round-trip time measurement is not lower than the maximum time Tmax.

According to a third aspect, the present invention provides a node for a packet-switched communication network, the node being configured to exchange a bidirectional packet flow with another node of the packet-switched communication network, the node being configured to apply a respective marking value to packets of the bidirectional packet flow to be transmitted to the other node, the node being configured to:
  a) switch the respective marking value applicable to the packets of the bidirectional packet flow to be transmitted to the other node upon detection of a switching of the marking value applied to packets of the bidirectional packet which are being received from the other node,
  wherein the node is configured to perform the switching of the respective marking value applicable to the packets of the bidirectional packet flow to be transmitted to the other node only if a time lapsing between such detection and subsequent transmission of a packet to the other node does not exceed a predefined threshold.

According to an advantageous embodiment, the node is further configured to force a switching of the respective marking value applicable to the packets of the bidirectional packet flow to be transmitted to the other node when a maximum time Tmax has lapsed since last switching of the respective marking value applicable to packets of the bidirectional packet flow to be transmitted to the other node.

According to a fourth aspect, the present invention provides a packet-switched communication network comprising two nodes exchanging a bidirectional packet flow, each one of the two nodes being configured to apply a respective marking value to of the bidirectional packet flow to be transmitted to the other node, wherein:

a) each one of the two nodes is configured to switch the respective marking value applicable to packets of the bidirectional packet flow to be transmitted to the other node upon detection of a switching of the marking value applied to packets of the bidirectional packet which are being received from the other node, wherein each one of the two nodes is configured to perform the switching of the respective marking value applicable to the packets of the bidirectional packet flow to be transmitted to the other node only if a time lapsing between such detection and subsequent transmission of a packet to the other node does not exceed a respective predefined threshold.

Preferably, the packet-switched communication network further comprises:

b) a measurement point placed on a path of the bidirectional packet flow, the measurement point being configured to detect a first switching and a second switching of the marking value applied to packets of the bidirectional packet flow transmitted from one of the two nodes and to the other one, and to provide a round-trip time measurement between the two nodes as a time lapsing between the first switching and the second switching.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
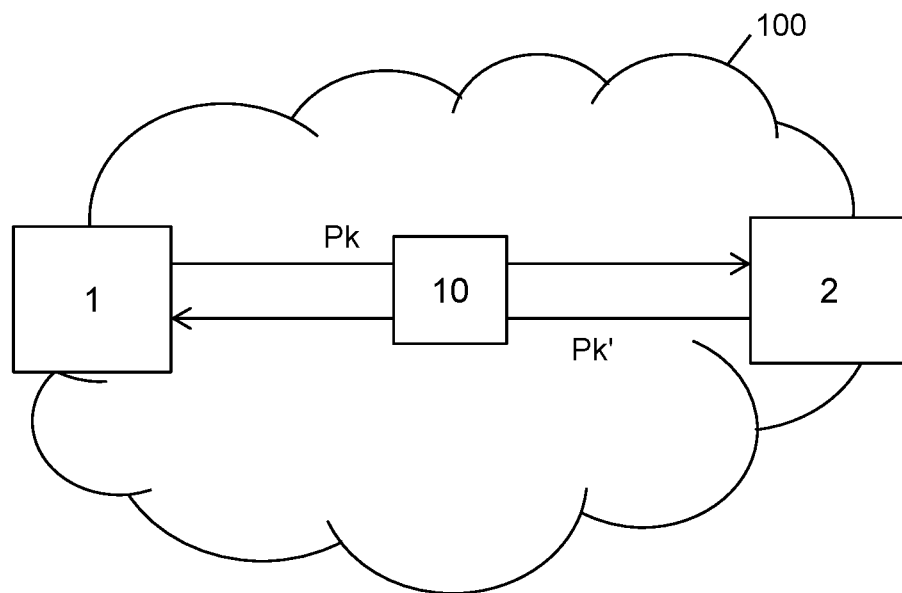
FIG. 1 schematically shows a packet-switched communication network in which the method for performing performance measurements according to embodiments of the present invention is implemented.

FIG. 1 schematically shows a packet-switched communication network 100 configured to perform an RTT measurement according to an embodiment of the present invention.

The communication network 100 comprises a plurality of nodes reciprocally interconnected by physical links according to any known topology, including two nodes 1 and 2 shown in FIG. 1. The nodes 1 and 2 may be connected by a single physical link or by the concatenation of several physical links and intermediate nodes (not shown in the drawings). The communication network 100 may be for instance an IP network.

The nodes 1, 2 exchange a bidirectional packet flow including packets Pk transmitted from the node 1 to the node 2 and packets Pk' transmitted from the node 2 to the node 1, as schematically depicted in FIG. 1. The packets Pk, Pk' carry live traffic, namely they are not generated for the purpose of the one-way delay measurement. The packets Pk may belong to a same packet flow (namely, they may all have a same source address and a same destination address, e.g. a same IP source address and a same IP destination address) or to different packet flows whose paths are overlapping between the nodes 1 and 2. Similarly, the packets Pk' may belong to a same packet flow or to different packet flows whose paths are overlapping between the nodes 2 and 1.

The packets Pk, Pk' are formatted according to a certain network protocol. By way of non limiting example, the network protocol may be the above mentioned QUIC protocol.

Figure 2:
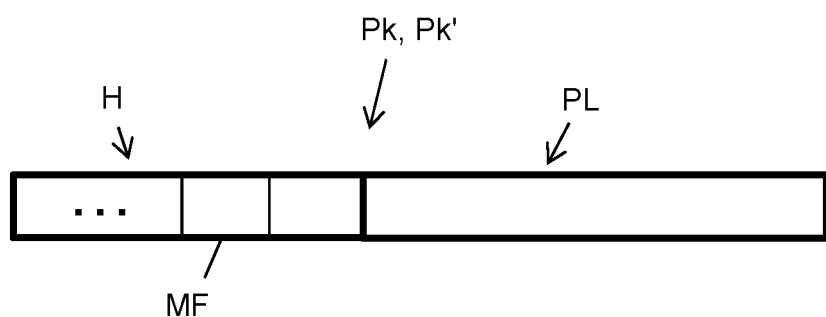
FIG. 2 schematically shows the structure of a packet exchanged in the communication network of FIG. 1, according to embodiments of the present invention.

In particular, as schematically depicted in FIG. 2, each packet Pk, Pk' comprises a payload PL comprising user data and at least one header H. In case of multiple headers, each header pertains to a different network layer. For example, each packet Pk, Pk' may comprise a network layer header (such as an IP header) and transport layer header (such as a QUIC+UDP header or a TCP header). One of the headers H (typically, the network layer header) comprises packet forwarding information, namely information allowing the packets Pk to reach the network node 2 and the packets Pk' to reach the node 1.

Each packet Pk, Pk' also preferably comprises at least one measurement dedicated field MF (also termed herein after "marking field") supporting a RTT measurement on the bidirectional packet flow Pk, Pk'. The marking field(s) MF may be comprised in the same header H as the packet forwarding information (as shown in FIG. 2), in a different header (if any) or in the payload PL. Assuming for example that the packets Pk, Pk' comprise a network layer header (such as an IP header) and a transport layer header (such as a QUIC header), the marking field(s) MF may be comprised in the transport layer header. The marking field MF comprises one or more bits, preferably a single bit. The marking field MF may be set to anyone of two alternative marking values (e.g. 0 and 1). By way of non-limiting example, if the packets Pk, Pk' are formatted according to the QUIC protocol, the marking field MF may be the spin bit comprised in the QUIC header as disclosed in the above Internet draft of B. Trammel et al.

Each node 1, 2 sets the value of the marking field MF in its respective outgoing packets Pk, Pk', before transmitting them to the other node 2, 1, so as to enable an RTT measurement between the nodes 1, 2. The marking value which each node 1, 2 applies to the packets Pk, Pk' to be transmitted to the other node 2, 1 will be termed herein after "applicable marking value" and will be designated as M1 and M2, respectively. When no RTT measurement is performed, the applicable marking values M1, M2 are both set to a same value by the nodes 1, 2, e.g. 0.

With reference now to the flow charts of FIGS. 3 and 4, the operation of the nodes 1, 2 will be described in further detail. If the nodes 1, 2 are the endpoints of a QUIC connection, the node 1 may be the one acting as client of the QUIC connection, while the node 2 may be the one acting as server of the QUIC connection.

Figure 3:
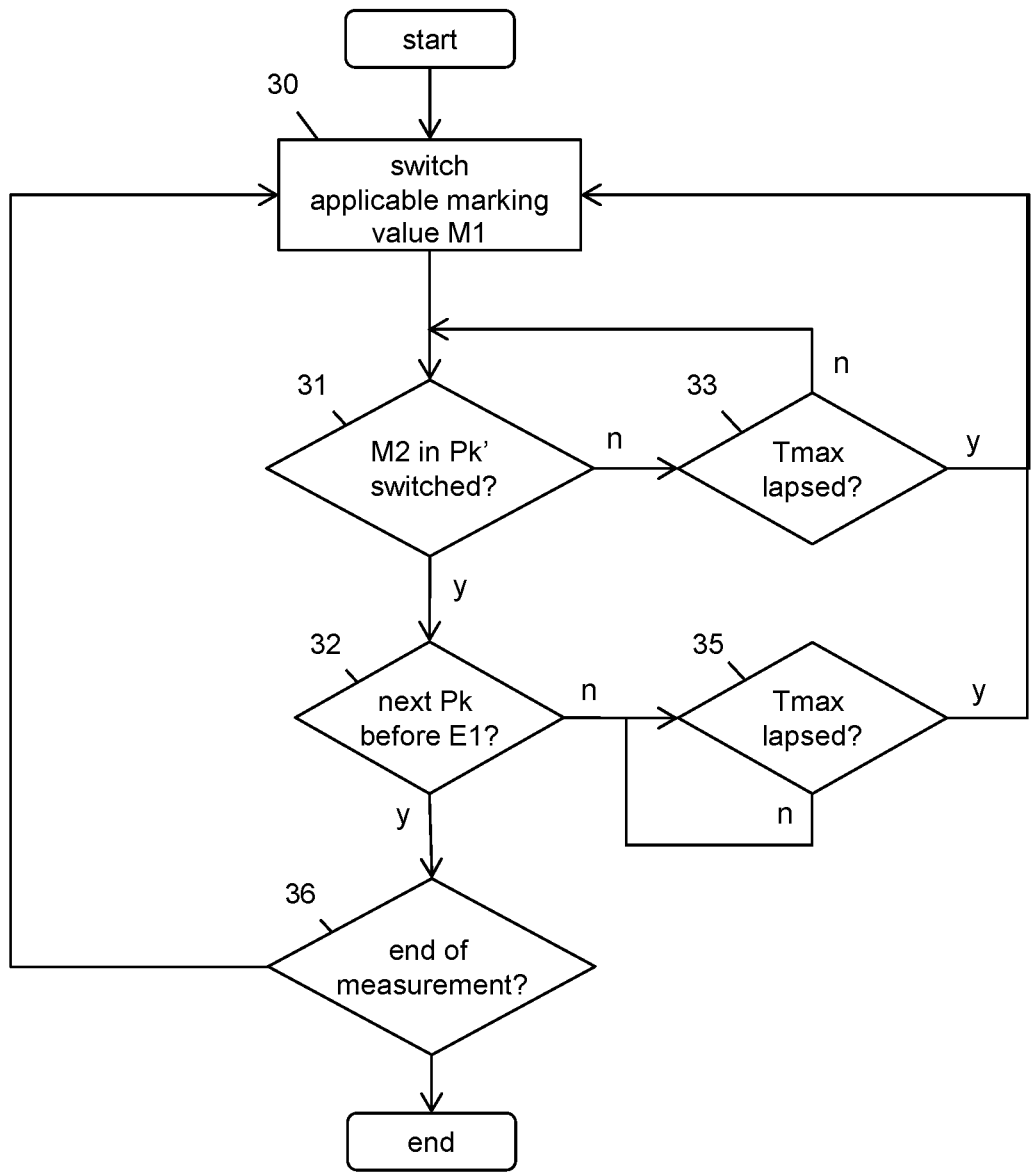
FIG. 3 is a flow chart of the operation of a first node of the communication network of FIG. 1, according to an embodiment of the present invention.

With reference first to the flow chart of FIG. 3, the node 1 preferably starts a measurement session by performing a first switching of its applicable marking value M1 (step 30). For example, if M1=0 before the measurement session is started, following to step 30 the applicable marking value M1 of the node 1 becomes M1=1.

The node 1 also continuously receives from the node 2 packets Pk' with the marking value M2 applied by the second node 2 (the rules whereby the node 2 sets its applicable marking value M2 will be described herein below with reference to the flow chart of FIG. 4).

As long as the node 1 does not detect any switching of the marking value M2 comprised in the packets Pk' (e.g. it receives packets Pk' with M2=0), it keeps its applicable marking value M1 fixed.

When instead the node 1 detects that the marking value M2 applied to the packets Pk' has been switched (step 31), it preferably starts a timer counting a time threshold E1.

If a packet Pk shall be transmitted to the node 2 before lapse of the time threshold E1 (step 32), then the node 1 reverts to step 30 and switches again its applicable marking value M1 (e.g. from 1 to 0). The new applicable marking value M1 is then applied to this packet Pk and to the subsequent ones.

Otherwise, if no packet Pk shall be transmitted to the node 2 before the time threshold E1 expires (e.g. because the packet rate from the node 1 to the node 2 is temporarily too low), the node 1 preferably keeps its applicable marking value M1 fixed.

Preferably, in order to properly detect the switching of the applicable marking value M2 in the packets Pk' and avoid inaccuracies due to possible reception sequence errors, each packet Pk' comprises a sequence number. As a packet Pk' is received by the node 1, the node 1 reads its sequence number. The node 1 determines that the switching of the applicable marking value M2 in the packets Pk' has occurred only if the sequence number of the first packet Pk' with the new applicable marking value M2 is higher than the sequence number of the previously received packet Pk'.

According to an embodiment, each time the node 1 performs the switching step 30, it also starts a further timer counting a maximum time Tmax.

The node 1 preferably waits for the marking value M2 applied to the packets Pk' being switched (step 31) until Tmax has lapsed (step 33). If no switching of the marking value M2 is detected in the packets Pk' before Tmax expires, then the node 1 reverts to step 30 and forces anyway the switching of its applicable marking value M1 (e.g. from 1 to 0).

Further, if—following to detection that the marking value M2 applied to the packets Pk' has been switched—the node 1 nonetheless does not switch its applicable marking value M1 due to expiration of the time threshold E1 (step 32), the node 1 waits until Tmax expires (step 35) and then reverts to step 30, thereby forcing anyway the switching of its applicable marking value M1.

Hence, according to this embodiment the node 1 basically performs an iteration of the switching step 30 of its applicable marking value M1 at most every Tmax milliseconds, even when the packet rate in any of the two counterpropagating directions does not allow a proper and timely operation of the switching of the applicable marking value at any of the nodes 1, 2.

The above steps are iterated by the node 1, until the end of the measurement session (step 36).

Figure 4:
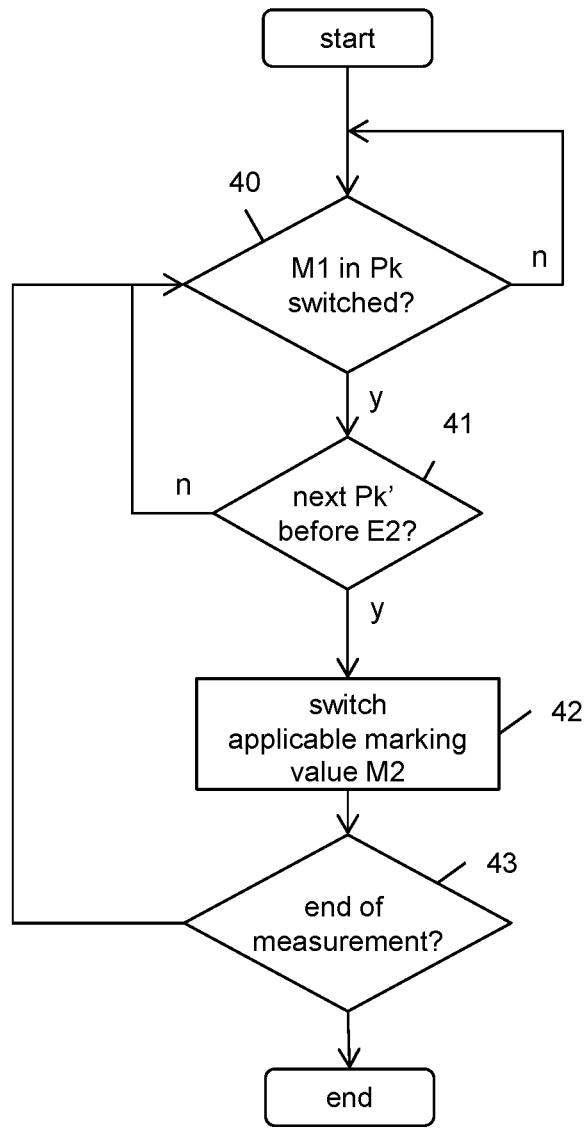
FIG. 4 is a flow chart of the operation of a second node of the communication network of FIG. 1, according to an embodiment of the present invention.

With reference now to the flow chart of FIG. 4, the node 2 continuously receives from the node 1 packets Pk with the marking value M1 applied by the first node 1 according to the flow chart of FIG. 3.

As mentioned above, before a measurement session is started, the applicable marking values M1, M2 are both set to a same value, e.g. 0. In order to start a measurement session, the node 1 switches it applicable marking value M1 (e.g. from 0 to 1).

As long as the node 2 does not detect any switching of the marking value M1 comprised in the packets Pk (e.g. it receives packets Pk with marking value M1=0) (step 40), it preferably keeps its applicable marking value M2 fixed.

When instead the node 2 detects that the marking value M1 applied to the packets Pk has been switched (namely, it has been switched from 0 to 1), it preferably starts a timer counting a time threshold E2. If a packet Pk' shall be transmitted to the node 1 before lapse of the time threshold E2 (step 41), then the node 2 switches its applicable marking value M2 (step 42). The new applicable marking value M2 is then applied to this packet Pk' and to the subsequent ones.

Otherwise, if no packet Pk' shall be transmitted to the node 1 before the time threshold E2 expires, the node 2 preferably keeps its applicable marking value M2 fixed.

Preferably, in order to properly detect the switching of the applicable marking value M2 in the packets Pk' and avoid inaccuracies due to possible reception sequence errors, each packet Pk comprises a sequence number. As a packet Pk is received by the node 2, the node 2 reads its sequence number. The node 2 determines that the switching of the applicable marking value M1 in the packets Pk has occurred only if the sequence number of the first packet Pk with the new applicable marking value M1 is higher than the sequence number of the previously received packet Pk.

The above steps are iterated by the node 2, until the end of the measurement session (step 43).

This operation of the nodes 1, 2 advantageously enables reliable RTT measurements between the nodes 1, 2, as it will be explained with reference to FIGS. 5a-5c.

Figure 5A:
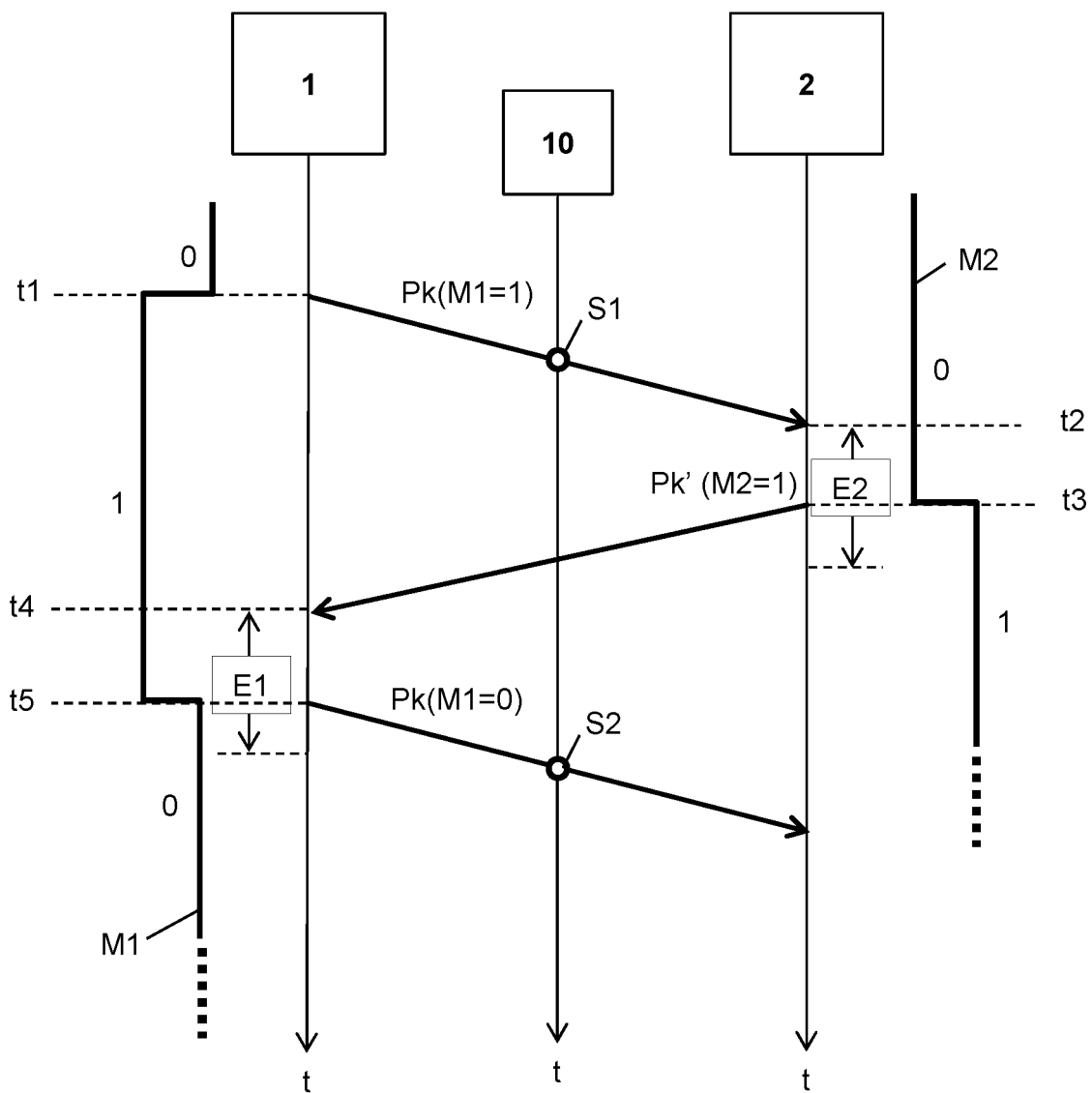
FIGS. 5a-5c show three exemplary scenarios which might occur at the first and second nodes of the communication network of FIG. 1.

With reference first to FIG. 5a, assuming that, before the measurement session, both the nodes 1, 2 are configured with an applicable marking value M1, M2 equal to 0, at time t1 the node 1 starts a measurement session by switching its applicable marking value M1 from 0 to 1 (step 30).

As long as the node 2 receives packets Pk with marking value M1 equal to 0, it keeps its own applicable marking value M2 fixed (step 40).

Then, at time t2, the node 2 detects that the marking value M1 of the packets Pk has been switched from 0 to 1. The node 2 then waits for the next packet Pk' to be transmitted to the node 1 (step 41). In the scenario of FIG. 5a, it is assumed that the transmission time t3 of the next packet Pk' to be transmitted to the node 1 is delayed relative to t2 by less than the time threshold E2. Hence, at time t3 the node 2 switches its applicable marking value M2 from 0 to 1 (step 42).

As long as the node 1 receives packets Pk' with marking value M2 equal to 0, it keeps its own applicable marking value M1 fixed (step 31).

Then, at time t4, the node 1 detects that the marking value M2 of the packets Pk' has been switched from 0 to 1. The node 1 then waits for the next packet Pk to be transmitted to the node 2 (step 32). In the scenario of FIG. 5a, it is assumed that the transmission time t5 of the next packet Pk to be transmitted to the node 1 is delayed relative to t4 by less than the time threshold E1. Hence, at time t5 the node 1 switches its applicable marking value M1 back from 1 to 0 (step 30).

A measurement point 10 placed on the path of the bidirectional packet flow (namely, at an intermediate position or at any of the two nodes 1, 2) may then perform an RTT measurement by detecting, in the flow of packets Pk transmitted from the node 1 to the node 2, the first switching S1 from 0 to 1 and the second switching S2 from 1 to 0 of the applicable marking value M1. The measurement point 10 may then provide an RTT measurement as the time lapsing between the detection times of these two consecutive switching S1 and S2.

More specifically, as the measurement point 10 detects the first switching S1 in the packets Pk, it preferably waits a predefined wait time W (with W<min (RTT)) before starting the search of the next switching S2. Hence, only RTT higher than W may be measured by the measurement point 10.

It may be appreciated that this RTT measurement is affected by a predictable maximum error equal to E1+E2.

Figure 5B:
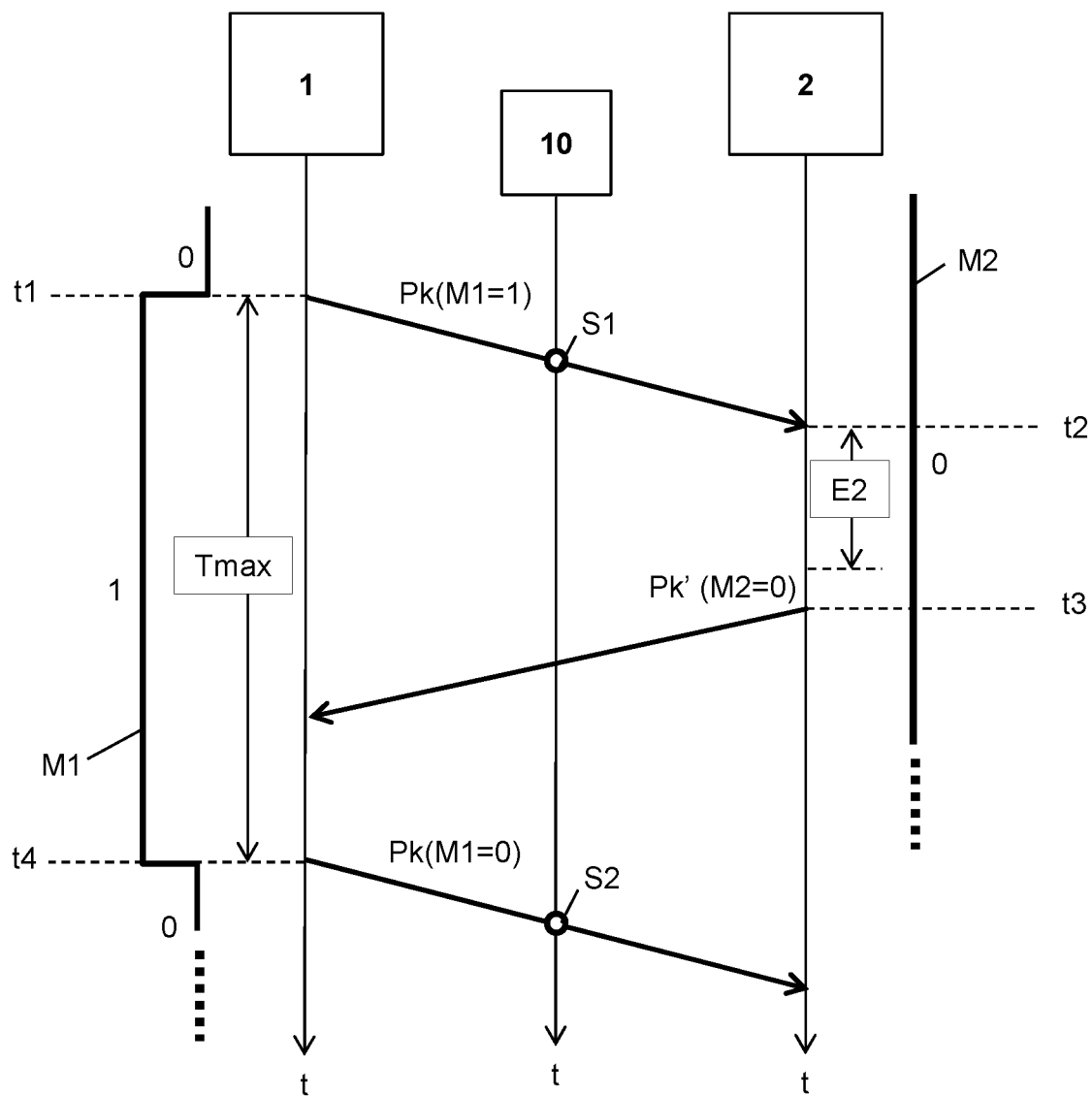

With reference now to FIG. 5b, the scenario depicted in this Figure differs from that of FIG. 5a in that it is assumed that, after the node 2 has detected at time t2 a switching of the applicable marking value M1 in the packets Pk, the transmission time t3 of the next packet Pk' to be transmitted to the node 1 is delayed relative to time t2 by more than the time threshold E2. Hence, at time t3 the node 2 does not switch its applicable marking value M2 and keeps it fixed to 0. The node 1 then continues receiving packets Pk' with marking value M2 equal to 0, and therefore keeps its applicable marking value M1 fixed (step 31). The node 1 preferably keeps its applicable marking value M1 fixed until time t4 (step 33), which is delayed by Tmax relative to time t1 of the last switching of its applicable marking value M1. Hence, at time t4 the node 1 forces the switching of its applicable marking value M1 back from 1 to 0 (step 30).

Figure 5C:
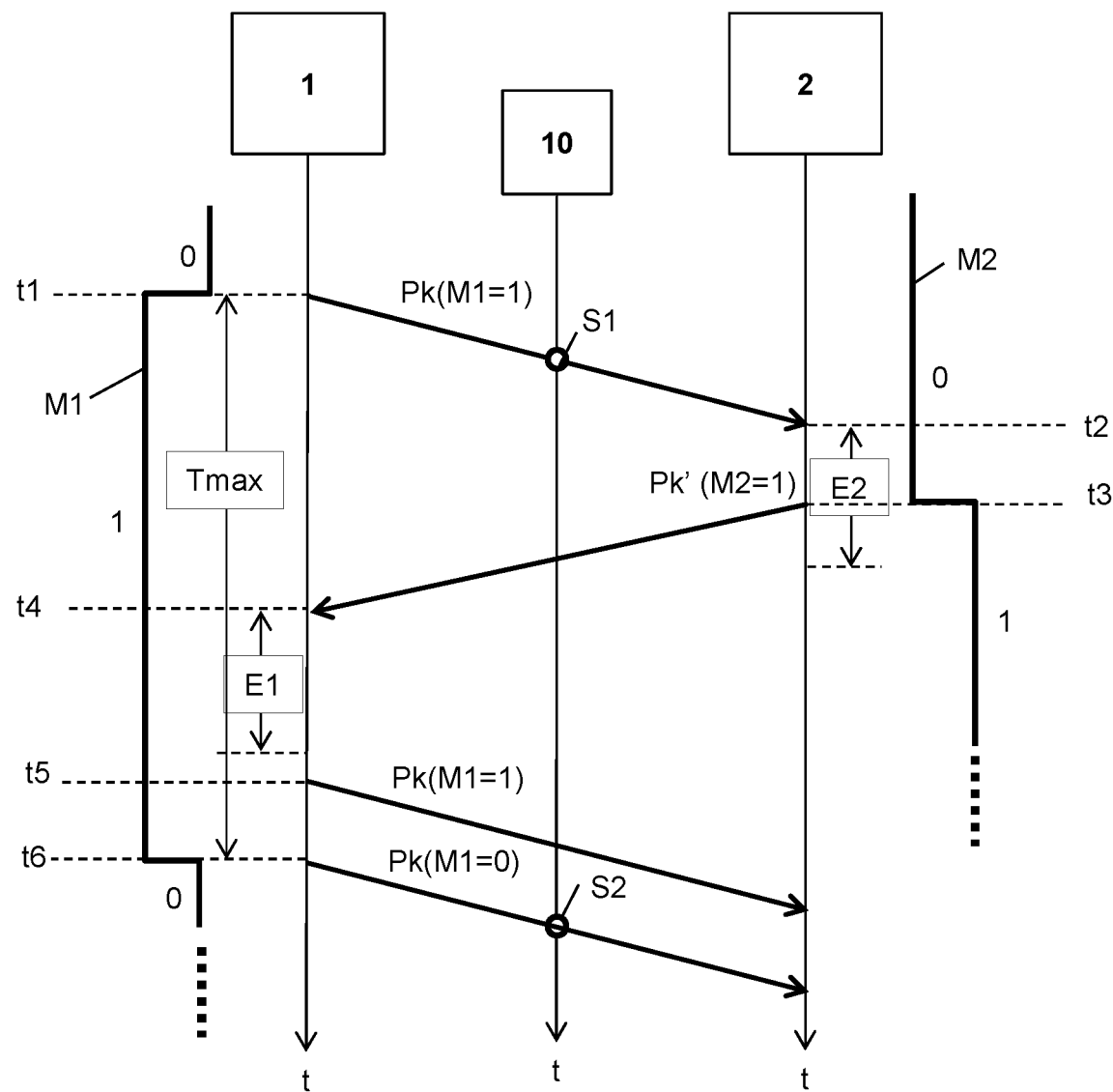

With reference now to FIG. 5c, the scenario depicted in this Figure differs from that of FIG. 5a in that, after the node 1 has detected at time t4 a switching of the applicable marking value M2 in the packets Pk', the transmission time t5 of the next packet Pk to be transmitted to the node 1 is delayed relative to time t4 by more than the time threshold E1. Hence, at time t5 the node 1 does not switch its applicable marking value M1 and keeps it fixed to 1. The node 1 preferably keeps its applicable marking value M1 fixed until time t6 (step 33), which is delayed by Tmax relative to time t1 of the last switching of its applicable marking value M1. Hence, at time t6 the node 1 forces the switching of its applicable marking value M1 back from 1 to 0 (step 30).

In the scenarios of FIGS. 5b and 5c, therefore, the time lapsing between the first switching S1 from 0 to 1 and the second, forced switching S2 from 1 to 0 of the applicable marking value M1 in the packets Pk is substantially equal to Tmax. Hence, if for example Tmax is selected much higher than the maximum RTT between the nodes (e.g. Tmax=1000 ms), the measurement point 10 may realize that the time lapsing between the detection times of the two consecutive switching S1 and S2 of the applicable marking value M1 in the packets Pk is too high, and hence does not provide a reliable (and hence valid) RTT measurement. For example, the measurement point 10 may consider an RTT measurement valid only if it is lower than Tmax (or, more preferably, lower than Tmax minus an error threshold, for example 10% Tmax). Otherwise, if the RTT measurement is not lower than Tmax (or, more preferably, not lower than Tmax minus an error threshold, for example 10% Tmax), then it is discarded.

Hence, advantageously, the method implemented by nodes 1, 2 according to embodiments of the present invention enables RTT measurements which provide more reliable results. In particular, an RTT measurement is provided only for couples of consecutive switching S1, S2 of the applicable marking value M1 in the packets Pk for which it can be guaranteed that the unpredictable fluctuations of the packet rates in the two opposite directions introduce a maximum error of E1+E2 on the RTT measurement. When this can not be guaranteed, the measurement point 10 discards the RTT measurement.

As mentioned above, in order to allow the measurement point 10 to determine the RTT measurements to be discarded, Tmax shall be much higher than the maximum RTT between the nodes 1 and 2. For example, Tmax may be set a priori to a value which is certainly much higher than the maximum RTT between the nodes 1 and 2, for example 1000 ms.

Alternatively, Tmax may be calculated as a function of a previously measured RTT. Such previously measured RTT may be obtained by any known technique for measuring the RTT on a link between two nodes. If RTT* is the previously measured RTT, Tmax may be calculated as a function of RTT* by applying the following equation:

$$Tmax = k \times RTT^* + Q,  \quad [1]$$

where k and Q are empirically dimensioned variables. For example, the Applicant has obtained positive results by setting k=1.5 and Q=80 ms.

According to an embodiment, at the beginning of the measurement session Tmax may be set equal to 1000 ms. Then, as a valid RTT measurement is obtained during the measurement session, the node 1 may recalculate Tmax by applying the above equation [1] to such valid RTT measurement.

According to a variant, the value of Tmax as provided by the above equation may be approximated to the closest integer submultiple of a maximum time TM counted by the local clock of the node 1. This increases the probability that the value of Tmax calculated by node 1 and the measurement point 10 is the same. For example, if TM is 1000 ms, Tmax as provided by the above equation is preferably approximated to the closest amongst 125 ms, 250 ms and 500 ms.

According to an advantageously variant, at least one of the nodes 1, 2 may dynamically vary the value of its time threshold E1, E2 during the measurement session. The example, one of the nodes 1, 2 may initially set its time threshold E1, E2 to a maximum initial value Emax (e.g. 1 ms). Then, each time the condition on the time threshold E1, E2 is met and the switching of its applicable marking value M1, M2 then properly operates, the node 1, 2 decreases the value of its time threshold E1, E2. The value of the time threshold E1, E2 may be decreased step-by-step from the maximum value Emax to a minimum value Emin. For this purpose, a number of predefined intermediate values comprised between Emin and Emax may be provided. Each time the condition on the threshold E1, E2 is met, the value of E1, E2 is decreased by one step until, either the minimum value Emin is reached, or the condition on the threshold E1, E2 is not met anymore. In the latter case, the node 1, 2 preferably increases the value of its time threshold E1, E2 by one step and keeps it fixed.

Hence, the nodes 1, 2 may apply time thresholds E1, E2 with different values, the value applied by each node 1, 2 basically depending on the packet rate in its outgoing direction. The higher and the more stable the packet rate in a direction, indeed, the lower the value of E1, E2 required to provide a proper operation of the switching mechanism at the node transmitting packets in that direction, the lower the contribution of that direction to the maximum error affecting the RTT measurement.

Further, even though in the above description it has been assumed that Tmax is a predefined time counted by a timer which the node 1 restarts each time it switches it applicable marking value M1, this is not limiting. Alternatively, for example, a time Tmax' may be counted by the measurement point 10 since detection of the last switching of the marking value M1 in the packets Pk, or since provision of the last valid RTT measurement. Upon expiry of Tmax', the measurement point 10 may generate an alert directly or indirectly inducing the node 1 to force a switching of its applicable marking value M1. The forced switching will then occur at a time Tmax>Tmax' since the last switching of the marking value M1. In this case Tmax is variable, since it depends not only on Tmax', but also on subsequent alert generation and transmission mechanisms inducing an unpredictable delay between expiry of Tmax' and the actual forced switching of the applicable marking value M1.

Though in the above description it has been assumed that the measurement point 10 is capable of detecting only packets Pk transmitted from node 1 to node 2, this is not limiting. The measurement point 10 may be capable of detecting packets Pk' transmitted in the opposite directions, in which case the RTT measurements are obtained based on the switching of the applicable marking value M2 in such packets Pk'.

If the measurement point 10 is capable of detecting both packets Pk and packets Pk', other time measurements can be made. The RTT measurements in the opposite directions may indeed be combined to provide half-way RTT measurements on both sides of the measurement point 10 (namely, from the measurement point 10 to a node 1, 2 and back).

Two or more measurement points may also be provided between the nodes 1 and 2. Their RTT measurements (end-to-end and half-way) may be combined to provide a further segmentation of the RTT measurements between the nodes 1 and 2.

The invention claimed is:

1. A method for transmitting a bidirectional packet flow between two nodes of a packet-switched communication network, each one of said two nodes applying a respective marking value to packets of said bidirectional packet flow to be transmitted to the other one of said two nodes, said method comprising:
   a) by each one of said two nodes, storing said respective marking value applicable to packets of said bidirectional packet flow to be transmitted to the other one of said two nodes, and switching said stored respective marking value after detection of a switching of the marking value being stored at the other one of said two nodes based on a switched marking value being applied to packets of said bidirectional packet flow which are being received from the other one of said two nodes,
   wherein each one of said two nodes performs said switching of said respective marking value applicable to said packets of said bidirectional packet flow to be transmitted to the other one of said two nodes only during a time that lapses between said detection and subsequent transmission of a packet to said other one of said two nodes and that does not exceed a respective predefined threshold.

2. The method according to claim 1, wherein one of said two nodes forces a switching of said respective marking value applicable to packets of said bidirectional packet flow to be transmitted to the other one of said two nodes when a maximum time has lapsed since last switching of said respective marking value applicable to packets of said bidirectional packet flow to be transmitted to the other one of said two nodes.

3. The method according to claim 1, wherein at each one of said nodes said respective predefined threshold is counted by a local timer which said each one of said nodes starts upon said detection of a switching of the marking value applied to packets of said bidirectional packet which are being received from the other one of said two nodes.

4. The method according to claim 1, wherein at least one of said two nodes dynamically varies said respective predefined threshold.

5. The method according to claim 4, wherein at least one of said two nodes is configured to set, when a measurement session is started, said respective predefined threshold to a maximum value Emax and decrease said respective predefined threshold when said time lapsing between said detection and subsequent transmission of a packet to said other one of said two nodes does not exceed said respective predefined threshold.

6. The method according to claim 5, wherein said respective predefined threshold is decreased by one.

7. The method according to claim 5, wherein said respective predefined threshold is decreased until a minimum value Emin.

8. The method according to claim 2, wherein said maximum time is counted by a further local timer which said one of said two nodes starts when it switches said respective marking value applicable to packets of said bidirectional packet flow to be transmitted to the other one of said two nodes, said one of said two nodes forcing a switching of said respective marking value applicable to packets of said bidirectional packet flow to be transmitted to the other one of said two nodes upon expiry of said further local timer.

9. The method according to claim 2, wherein said maximum time is higher than a maximum round-trip time between said two nodes.

10. The method according to claim 2, wherein said maximum time is calculated as a function of a previously measured round-trip time between said two nodes.

11. The method according to claim 2, further comprising discarding said round-trip time measurement when it is determined that a round-trip time measurement is not lower than said maximum time.

12. The method according to claim 1, wherein the respective marking value for the two nodes being the same value prior to a start of a measurement session.

13. A method for performing a round-trip time measurement on a bidirectional packet flow transmitted between two nodes of a packet-switched communication network, each one of said two nodes applying a respective marking value to packets of said bidirectional packet flow to be transmitted to the other one of said two nodes, said method comprising the steps of the method according to claim 1 and:
   a) by a measurement point placed on a path of said bidirectional packet flow, detecting a first switching and a second switching of the marking value applied to packets of said bidirectional packet flow transmitted from one of said two nodes and to the other one of said two nodes and providing a round-trip time measurement between said two nodes as a time lapsing between said first switching and said second switching.

14. A node for a packet-switched communication network, said node being configured to exchange a bidirectional packet flow with another node of said packet-switched communication network, said node being configured to apply a respective marking value to packets of said bidirectional packet flow to be transmitted to said other node, said node being configured to:
   a) store said respective marking value applicable to said packets of said bidirectional packet flow to be transmitted to said other node, and switch said stored respective marking value after detection of a switching of the marking value being stored at the other node based on a switched marking value being applied to packets of said bidirectional packet flow which are being received from said other node, wherein said node is configured to perform said switching of said respective marking value applicable to said packets of said bidirectional packet flow to be transmitted to said other node only during a time that lapses between said detection and subsequent transmission of a packet to said other node and that does not exceed a predefined threshold.

15. The node according to claim 14, wherein said node is further configured to force a switching of said respective marking value applicable to said packets of said bidirectional packet flow to be transmitted to said other node when a maximum time has lapsed since last switching of said respective marking value applicable to packets of said bidirectional packet flow to be transmitted to said other node.

16. A packet-switched communication network comprising two nodes exchanging a bidirectional packet flow, each one of said two nodes being configured to apply a respective marking value to packets of said bidirectional packet flow to be transmitted to the other one of said two nodes, wherein:

a) each one of said two nodes is configured to store said respective marking value applicable to packets of said bidirectional packet flow to be transmitted to the other one of said two nodes, and switch said stored respective marking value after detection of a switching of the marking value being stored at the other one of said two nodes based on a switched marking value being applied to packets of said bidirectional packet flow which are being received from the other one of said two nodes, wherein each one of said two nodes is configured to perform said switching of said respective marking value applicable to said packets of said bidirectional packet flow to be transmitted to the other one of said two nodes only during a time that lapses between said detection and subsequent transmission of a packet to said other one of said two nodes and that does not exceed a respective predefined threshold.

17. The packet-switched communication network according to claim 16, further comprising:

b) a measurement point placed on a path of said bidirectional packet flow, said measurement point being configured to detect a first switching and a second switching of marking value applied to packets of said bidirectional packet flow transmitted from one of said two nodes and to the other one of said two nodes, and to provide a round-trip time measurement between said two nodes as a time lapsing between said first switching and said second switching.

* * * * *